United States Patent
Saavedra

(10) Patent No.: US 9,441,999 B2
(45) Date of Patent: Sep. 13, 2016

(54) DUAL DISTANCE TO EMPTY FUNCTION FOR BI-FUEL VEHICLE

(71) Applicant: FORD GLOBAL TECHNOLOGIES, LLC, Dearborn, MI (US)

(72) Inventor: Jose Guillermo Saavedra, Tlalpan (MX)

(73) Assignee: Ford Global Technologies, LLC, Dearborn, MI (US)

( * ) Notice: Subject to any disclaimer, the term of this patent is extended or adjusted under 35 U.S.C. 154(b) by 186 days.

(21) Appl. No.: 13/968,589

(22) Filed: Aug. 16, 2013

(65) Prior Publication Data

US 2015/0051825 A1 Feb. 19, 2015

(51) Int. Cl.
| | |
|---|---|
| *G01F 9/02* | (2006.01) |
| *B60K 37/02* | (2006.01) |
| *G07C 5/00* | (2006.01) |
| *F02D 19/06* | (2006.01) |
| *B60K 35/00* | (2006.01) |
| *B60W 50/14* | (2012.01) |

(52) U.S. Cl.
CPC .............. *G01F 9/023* (2013.01); *B60K 35/00* (2013.01); *B60K 37/02* (2013.01); *F02D 19/0618* (2013.01); *F02D 19/0647* (2013.01); *G07C 5/00* (2013.01); *B60W 2050/146* (2013.01); *B60W 2560/02* (2013.01); *B60W 2560/06* (2013.01); *F02D 19/066* (2013.01); *Y02T 10/36* (2013.01); *Y10T 29/49622* (2015.01)

(58) Field of Classification Search
CPC .................. B60W 2050/146; B60W 2560/02; B60W 2560/06; B60K 35/00; B60K 37/02; Y02T 10/36

See application file for complete search history.

(56) References Cited

U.S. PATENT DOCUMENTS

| | | | |
|---|---|---|---|
| D293,896 S | 1/1988 | Basaglia et al. | |
| 5,224,457 A | 7/1993 | Arsenault et al. | |
| 5,411,058 A | 5/1995 | Welsh et al. | |
| 5,658,013 A | 8/1997 | Bees et al. | |
| 5,668,310 A * | 9/1997 | Parkman et al. | 73/114.52 |
| 5,782,222 A | 7/1998 | Morris et al. | |
| 6,625,552 B1 | 9/2003 | Delvecchio et al. | |
| 7,444,986 B2 | 11/2008 | Shute | |
| 8,151,780 B2 | 4/2012 | Douzono et al. | |
| 8,296,048 B2 * | 10/2012 | Henderson et al. | 701/123 |
| 8,670,888 B1 * | 3/2014 | Brenner | 701/22 |
| 2007/0203625 A1 * | 8/2007 | Quigley et al. | 701/33 |
| 2010/0194553 A1 * | 8/2010 | Mizutani et al. | 340/438 |
| 2011/0010030 A1 * | 1/2011 | Yamamoto | 701/22 |
| 2011/0137470 A1 * | 6/2011 | Surnilla et al. | 700/282 |
| 2013/0000607 A1 | 1/2013 | Watanabe | |
| 2013/0090792 A1 * | 4/2013 | Eom et al. | 701/22 |
| 2013/0199482 A1 * | 8/2013 | Langston et al. | 123/1 A |
| 2014/0238340 A1 * | 8/2014 | Dunn et al. | 123/299 |
| 2014/0331642 A1 * | 11/2014 | Dearth et al. | 60/273 |

OTHER PUBLICATIONS

2012 Honda Civic Natural Gas Brochure (5 pages).

* cited by examiner

*Primary Examiner* — Mussa A Shaawat
(74) *Attorney, Agent, or Firm* — Frank A. MacKenzie; Brooks Kushman P.C.

(57) ABSTRACT

A vehicle includes a powertrain comprising an engine configured to separately burn first and second types of fuels and propel the vehicle therefrom, and a computer programmed to compute a distance traveled per unit fuel burned for each fuel type, compute distance-to-empty (DTE) for each fuel type, and display DTE for each fuel type.

13 Claims, 4 Drawing Sheets

DUAL DISTANCE TO EMPTY FUNCTION FOR BI-FUEL VEHICLE

BACKGROUND

In recent years, vehicles have included features that display instantaneous gas mileage, long-term gas mileage, and the like. One feature displayed is distance-to-empty (DTE), which is a calculated distance, in typically miles or kilometers, based on average fuel consumption and a measured amount of fuel left in the tank. However, in recent years, bi-fuel vehicles have been developed that enable two types of fuels to be consumed to propel the vehicle. For instance, in a gasoline engine, a second fuel in a bi-fuel application may include compressed natural gas (CNG) or liquefied petroleum gas (LPG), as examples. The method to determine DTE based on such fuels is different from that done in a more traditional gasoline engine. And, oftentimes a vehicle originally fabricated with only a single-fuel capability is retrofitted with a second fuel type. As such, DTE is typically displayed, at most, for one of the fuels in the vehicle. However, since the addition of the second fuel capability is given in the aftermarket, the DTE offered initially for the first fuel type becomes erratic. Nevertheless, it is important for a driver to know the entire vehicle DTE in a bi-fuel operation to enable the driver to plan appropriately for refueling events.

Thus, there is a need for an improved DTE display in a bi-fuel vehicle.

SUMMARY

A vehicle includes a powertrain comprising an engine configured to separately burn first and second types of fuels and propel the vehicle therefrom, and a computer programmed to compute a distance traveled per unit fuel burned for each fuel type, compute distance-to-empty (DTE) for each fuel type, and display DTE for each fuel type.

A method of manufacturing a bi-fuel vehicle includes fabricating a vehicle having an ability to power the vehicle from a first fuel and from a second fuel, and providing a computer that is programmed to compute a distance traveled per unit fuel burned for the first fuel type and for the second fuel type, compute distance-to-empty (DTE) for each fuel type, and display DTE for each fuel type.

A non-transitory computer-readable medium tangibly embodying computer-executable instructions that cause the computer to compute a distance traveled per unit fuel burned for each fuel type within a bi-fuel vehicle, compute distance-to-empty (DTE) for each fuel type, and display DTE for each fuel type.

DETAILED DESCRIPTION

The illustrative embodiments include a bi-fuel vehicle having a distance-to-empty (DTE) for each fuel type of the bi-fuel vehicle.

Figure 1:
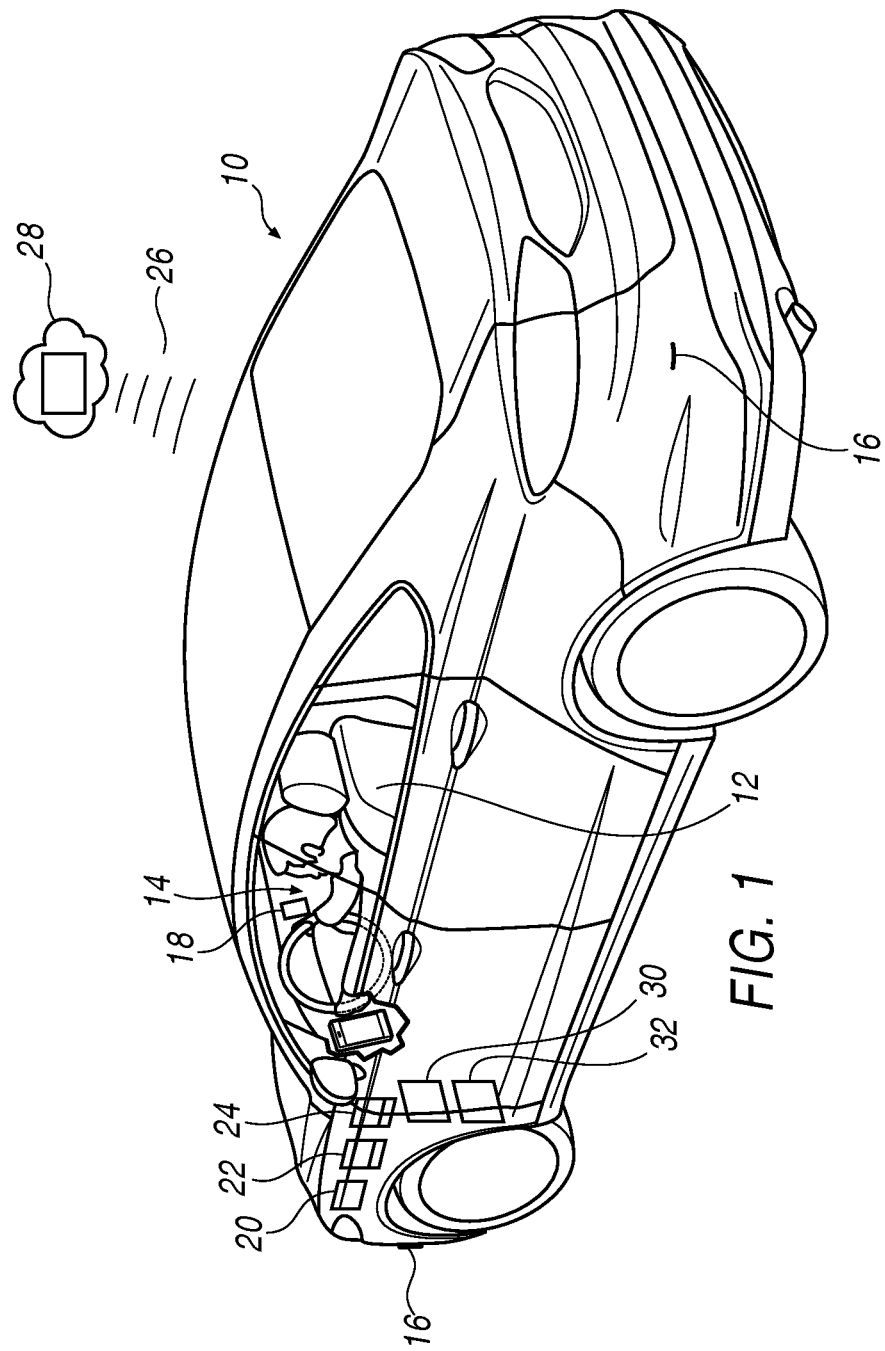
FIG. 1 illustrates a vehicle that includes features that are incorporated into the disclosed system and method.

FIG. 1 shows an illustration of a dual or bi-fuel vehicle 10 having features that include the disclosed system and method. Vehicle 10 is illustrated as a typical 4-door sedan, but may be any vehicle for driving on a road, such as a compact car, a pickup truck, or a semi-trailer truck, as examples. Vehicle 10 includes a seat 12 for positioning a driver. Vehicle 10 includes a cluster or dashboard 14 that typically includes a speedometer, tachometer, and control buttons or switches for activating various devices on vehicle 10. A steering wheel is positioned such that the driver can steer vehicle 10 while driving.

Vehicle 10 includes a number of features which include, but are not limited to, an airbag system, various sensors 16 throughout vehicle 10, an audio/visual (A/V) system 18, a GPS 20, and a communication system 22 that includes, but is not limited to, a Wi-Fi system, an embedded modem, and a dedicated short-range communication (DSRC) system. A DSRC uses one-way or two-way short to medium-range wireless communication channels specifically designed for automotive use and a corresponding set of protocols and standards. A computer or computing device 24 is positioned within vehicle 10, which provides any number of features that include controlling engine and other vehicle parameters, monitoring vehicle operation (safety devices, tire pressure, etc. . . . ), interfacing with the driver via the A/V system 18, monitoring vehicle position via GPS 20, providing map and directions to the driver using GPS information, to name a few. A/V system 18 may provide warning a driver or other occupant of a car of a hazard, for instance, may inform the driver of driving instructions, or may provide other features.

Communication system 22 is configured to operate wirelessly with systems external to vehicle 10. In one embodiment, signals are sent wirelessly 26 external to the vehicle, such as to a "cloud computing" device or collection of computers or computing devices 28. Signals may also be sent from communication system 22 via the Wi-Fi_33 system, the embedded modem, or DSRC to other devices external to the vehicle. In one embodiment, computer interaction is with a computing system that is accessible to the internet.

Vehicle 10 also includes a powertrain 30 having engine 32 that is configured to propel vehicle 10 by extracting power from fuel. Engine 32 is configured to burn multiple types of fuels and, in one embodiment, is a bi-fuel engine that is configured to burn a first fuel type and a second fuel type. For instance, the first fuel type may be gasoline and the second fuel type may be either liquefied petroleum gas (LPG) or compressed natural gas (CNG), as examples. The bi-fuel engine is configured, as will be further illustrated, to switch between the first fuel type and the second fuel type, depending on the desire of a driver or operator.

Figure 2:
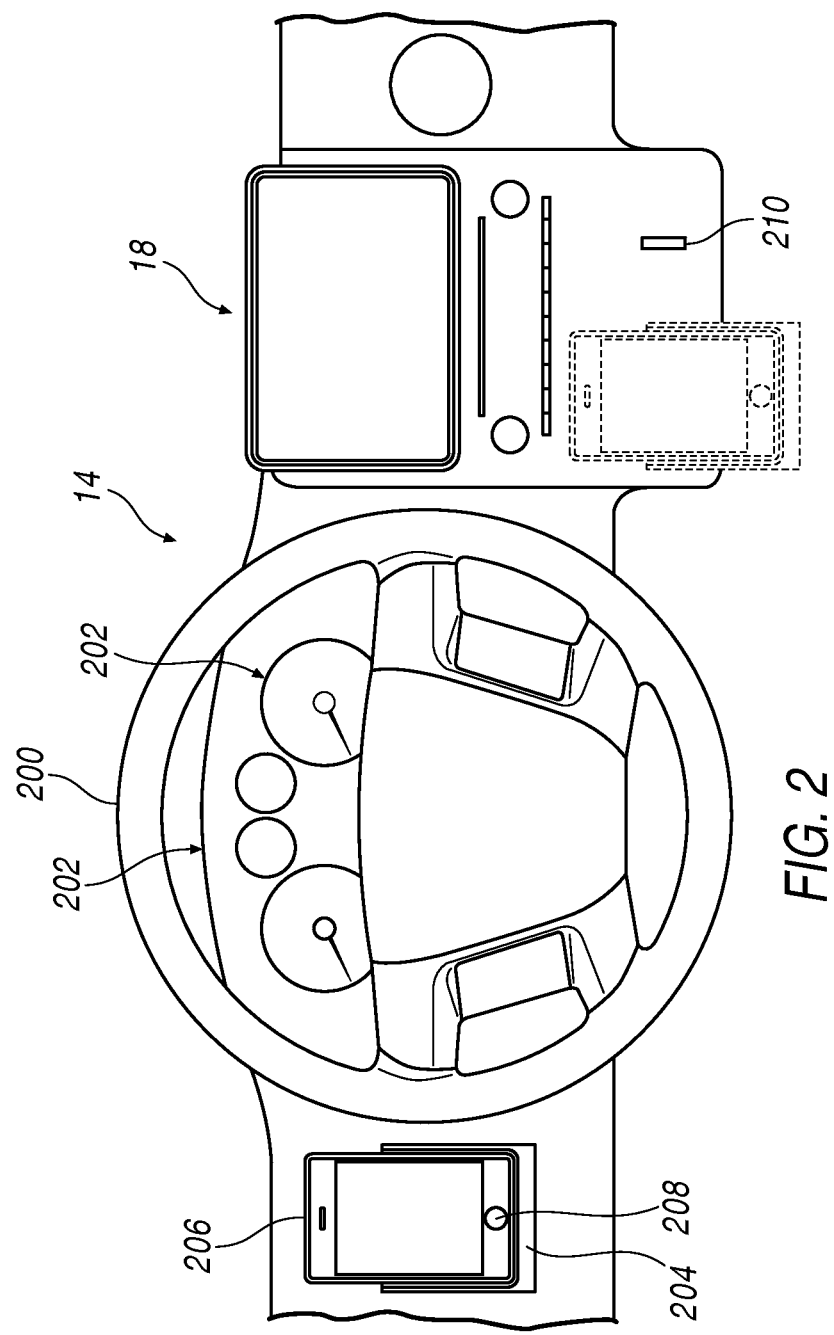
FIG. 2 illustrates a dashboard of a vehicle.

Referring to FIG. 2, dashboard 14 includes a steering wheel 200 and instruments 202 that display vehicle speed, engine speed (e.g., in a tachometer), and the like. Dashboard 14 includes a holder 204 to which a cellphone or cellular telephone 206 is attached. Holder 204 includes any device for holding cellphone 206, such as a clamping device, Velcro, or a device with slots into which cellphone 206 slides, as examples. In an alternative embodiment, holder 204 is not provided and cellphone 206 may be simply placed in the vehicle next to the driver.

In addition to conventional cellphone communication capability (e.g., for telephone calls), cellphone 206 includes a wireless communication device such as Bluetooth or other known methods for communicating with a local device such as computing device 24 of vehicle 10. Such may be useful for sending music or other information for use on a sound system of vehicle 10, or for communicating with a safety system of vehicle 10, or for communicating with computing device 24 to obtain and display distance-to-empty (DTE) features disclosed herein, as examples.

Cellphone 206, in one embodiment, is a "smartphone" that is capable of executing software applications, or "apps", that interact with the internet via a touchscreen or other known methods. Cellphone 206 includes a camera 208 and at least one of a keypad and display. As such, a driver or other occupant of a vehicle may communicate wirelessly with computers that are external to the vehicle using computing device 24 and interfacing therewith by using an "app" on cellphone 206, and/or by using audio/visual system 18. Such communication may be with an icon-driven touchscreen, voice-recognition, or by using a text feature, as examples, and touchscreen or voice-recognition may be preferred to prevent a driver from performing an unsafe activity, such as texting while driving. Communication may be via computing device 24 to computing devices 28 or to another computer. That is, an occupant of a vehicle may communicate with computers external to the vehicle via any number of means, including but not limited to a cell phone and/or via a communication system that is part of the vehicle and may be incorporated into a dashboard thereof. Communication is wireless and two-way and may include cloud computing devices and/or a computer device affiliated with a business or industry.

Dashboard 14 includes a toggle switch 210 that toggles a display of DTE between the first type of fuel and a second type of fuel. Toggle switch 210 is operable independent of the type of fuel being burned, and is thus able to display DTE for either one of the first and second fuel types regardless of which fuel mode is currently being used. As an example, if the vehicle is currently burning gasoline, toggle switch 210 may be placed in a first position to display DTE for gasoline or a second position to display DTE for a second fuel, such as LPG or CNG.

Display of DTE for each fuel type may be on A/V system 18 and/or cellular telephone 206. That is, A/V system 18 may be in direct communication with communication system 22, and cellular telephone 206 may be in wireless communication with communication system 22, as described. Further, instead of a physical (i.e., mechanical) toggle switch 210, it is contemplated that a "software" toggle or fuel type selection may be included in lieu of a physical device. As such, an icon may be presented on A/V system 18 or on cellular telephone 206 that is controllable via a touchscreen. That is, A/V system 18 may include a touch-sensitive surface that can detect a tactile motion to toggle between displays, or an "app", on cellular telephone 206 and may also include a touch-sensitive surface that can detect a tactile motion as well. In one embodiment, communication with the internet may be accomplished wirelessly via, for instance, computing devices 28 as described. In this embodiment, DTE information may be accessible to a person external to the vehicle so that the external person may, likewise, monitor DTE as it is also displayed in the vehicle. In this embodiment as well, remote operation is limited to display only and remote access is therefore simply to provide, at the option of the vehicle operator, display of DTE.

Figure 3:
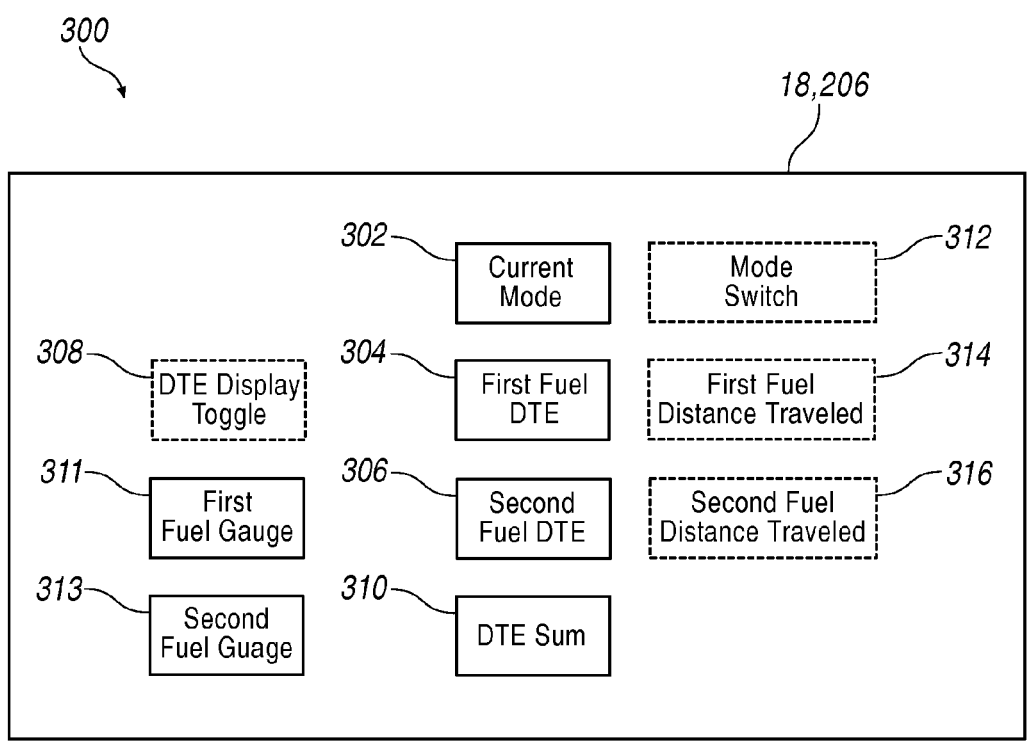
FIG. 3 illustrates an example of a display for elements of DTE and related optional parameters.

Referring to FIG. 3, a display is shown according to a disclosed embodiment. Display 300 is an illustration of a display as it may be shown on A/V system 18 or on cellular telephone 206. Display 300 includes a display of current mode of operation 302, more specifically to show which fuel type is currently active (e.g., gasoline as one option, and LPG or CNG as another option) in the bi-fuel vehicle. Display 300 also includes the fuel gauge 311 that will show the amount of active fuel available. In one embodiment, display 300 also includes a simultaneous fuel gauge 313 to indicate the amount of second fuel. DTE is calculated for each fuel type and, thus, the first fuel DTE is displayed 304. In one embodiment, display 300 also includes simultaneous display of second fuel DTE 306 as well. However, in an embodiment where only one of the DTEs is displayed, then an optional DTE display toggle 308 is included that enables switching between fuel type DTEs screens, in which case only one DTE is displayed at a time, such as display 304 (and not display 306). In one embodiment, the display 300 displays distances traveled for each fuel type, and in another embodiment, the fuel amount for both fuel types is displayed using the same fuel gauge (e.g., one of the first fuel gauge 311 and the second fuel gauge 313). Similarly, in an embodiment where only one fuel gauge is available this, gauge 311 (and not gauge 313) will indicate the active fuel (e.g., as soon as the vehicle starts its operating with the second fuel, the gauge will toggle to show the second fuel amount). This embodiment (having only one gauge) is capable to display the fuel level/amount of the non-active fuel by means of a routine applied with the mode switch 312. According to this embodiment, a sum of each DTE is displayed 310 as well. DTE sum 310 may be displayed in an embodiment where only the current fuel mode DTE 302 is displayed, and DTE sum 310 may also be displayed in the embodiment where both DTE displays 304, 306 are shown. Thus, in an example, DTE may be determined for first fuel type (gasoline) to be 200 km and displayed at 304, and DTE for second fuel type (CNG) may be determined to be 100 km and displayed at 306, in which their sum is displayed at 310.

As stated, mode selection may be via a mechanical or toggle switch 210, but in another embodiment, the switching between modes may be via touchscreen. As such, in one example a mode switch 312 is included that enables toggling or switching between modes. As stated, mode switch 312 is operable independent of the type of fuel being burned, and is thus able to display DTE for either one of the first and second fuel types 304, 306 regardless of which fuel mode is currently being used. Further, it is contemplated that both displays 304, 306 may be displayed simultaneously, thus their display is independent of which mode is currently selected via toggle 210 or mode switch 312. In addition, to further inform the driver of vehicle operation and fuel use in general, it is contemplated that distance traveled for each fuel type may be displayed as well. Thus, in one embodiment, first fuel distance traveled 314 and second fuel distance traveled 316 may be visually displayed as options.

Figure 4:
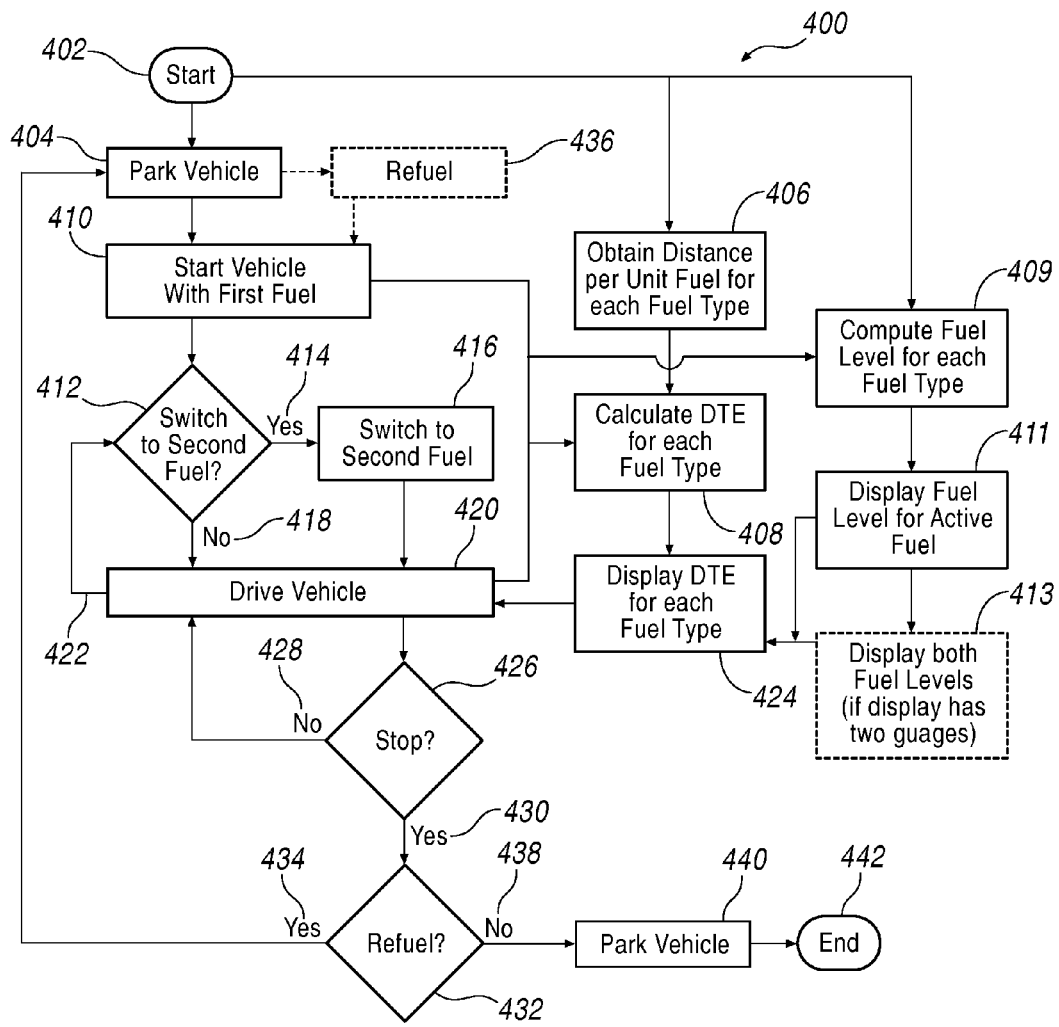
FIG. 4 illustrates steps in a method of operating a bi-fuel vehicle having dual DTE display.

Referring to FIG. 4, a method 400 of operating a vehicle according to the disclosure is illustrated in block diagram. Method 400 starts 402 and a vehicle, such as vehicle 10 of FIG. 1, is parked at step 404. Method 400 also includes a parallel path of activity in which DTE is calculated for each fuel type. Thus, block 406 illustrates a step to determine a distance per unit fuel for each type. Such determination at block 406 can be via a computation that is based on past vehicle performance, or can be based on default parameters for the vehicle and the type of vehicle. In one embodiment, DTE is computed for each fuel type and based on an average "mileage" (that is, distance traveled per unit fuel) that has been experienced in the vehicle over a given period of time or distance traveled. For instance, such may be based on the previous 100 or 1000 kilometers of travel for the given type of fuel for those kilometers traveled. As shifting occurs between each fuel type, computer 24 of vehicle 10 thereby keeps track of mileage specific to each fuel type over the previous distance used for such calculation. However, in another embodiment, distance per unit fuel is obtained via a computation of signals that contain vehicle's performance information that, in conjunction with default value, may be pre-set in the factory and represent vehicle's specific parameters that are gathered based on such things as fleet averages, road testing, and the like. In such fashion, computer 24 is able to obtain distance traveled per unit fuel for each fuel type at block 406, as well as compute the fuel level of both fuels in a parallel execution supplying the available fuel amount for both fuels, a parameter that is important for DTE computations.

At block 408, method 400 includes calculating DTE for each fuel type, based on the amount of fuel that is present in each fuel tank. In the case of gasoline, the volume of fuel in the tank (i.e., number of liters or gallons) can be determined, for instance, by knowing the volume of the tank, its volumetric characteristics, and the depth of fuel from, for instance, a float within the fuel tank (e.g., a conventional gas gauge in one example). In an example, in the case of LPG as a second fuel, an amount of LPG can be determined based on a level of liquid fuel stored in the tank. In the case of CNG, such may be based on a fuel level that is obtained via, for instance, a pressure gauge, in which case the pressure can be directly translated to an amount of fuel in the tank using known equations (which can translate proportionally, in one example, to a known % fill of the tank). Regardless, a fuel gauge angular position may be obtained that corresponds to the mass, volume, or weight of the fuel which can be used to translate to a "gasoline equivalent" and ultimately to DTE using a parameterized function that is specific to the given fuel type. Thus, in these examples, the amount of fuel is obtained by measuring volume, mass, and/or weight of the fuel and converting that amount of fuel to a DTE for each fuel type. Since both fuel amounts are dually computed, this enables the option of updating the non-active fuel DTE if a re-fill event has happened. In one example, the vehicle has stopped to refill CNG tanks. Since the active fuel is not CNG, the fuel gauge is showing only GAS level (in case of having only one fuel gauge). Thus, the driver can be informed of the new CNG driving range by means of reading the CNG DTE that was immediately updated after the refill (even though a transition to CNG mode has not happened). In one example of secondary (i.e., non-gasoline) fuels, DTE may be determined by converting to a "gasoline equivalent" that is based on chemical equivalence in comparison to gasoline and may include empirically obtained information to correct for theoretical values that may not be practically observed. In fact, it is contemplated that the DTE for each fuel type is calculable at step 408 and, in parallel, through any known means in which the volume or mass or weight of the fuel is obtained and, based on the "distance per unit fuel" for each fuel type of block 406, DTE for each fuel type can thereby be readily obtained. Thus, a computer, such as computer 24 on vehicle 10, accesses fuel burn parameters (i.e., distance per unit fuel) of the vehicle for each fuel type, and computes the DTE for each fuel type based on the fuel burn parameters for each fuel type.

Also, at block 409, the fuel level is calculated for each fuel type, and, at block 411, the fuel level for the currently used fuel, or "active" fuel, is displayed. In an embodiment where a display has two gauges, then, at block 413 the fuel level for both fuels is displayed.

Returning to vehicle operation and beginning with a parked vehicle at block 404, the vehicle is started at block 410 with a first fuel. The "first fuel" here may be any of the fuels in the bi-fuel vehicle, such as gasoline or LPG or CNG, depending on the types of fuel the bi- or multi-fuel vehicle is configured for. The driver may also elect to switch to a second fuel 412, as it may be desirable to be operating in second fuel but, in some examples, it may only be possible to start the vehicle using the first fuel (such as gasoline). If a second fuel is desired 414, then the mode is switched to the other of the fuel 416 of the bi-fuel vehicle, via toggle switch 210 or mode switch 312, as examples. If it is not desired to switch to another fuel type 418, then the vehicle is driven at block 420. However, during any stage of operation and assuming adequate fuel is present in storage, control may return 422 to block 412 to enable switching to the other fuel type.

In case of the need of knowing the fuel amount of the non-active fuel, the method 400 considers the option of executing a routine with the mode switch 312 in order to display the second fuel level with no need to request the vehicle to transition to the second fuel active. This is very useful in cases where the display 300 only comes with one fuel gauge.

During driving 420, DTE for each fuel type is displayed at block 424. As such and consistent with the embodiments disclosed in FIG. 3, the driver is continuously apprised of the current mode 302, one DTE 304 (i.e., pertaining to the current mode), or both DTEs 304/306, as well their sum 310. In such fashion, a driver is able to drive in a fashion that reduces overall fuel consumption or overall cost of vehicle operation. For instance, if CNG cost per unit distance is less than that of the other bi-fuel option (i.e., gasoline), it may be desirable to operate in CNG mode whenever possible, which can be better timed by knowing DTE for each fuel type (enabling the use of gasoline as a backup fuel, for example). In another example, a GPS or overall map of a trip may indicate which fuel types are available in upcoming refueling stations. Thus, if the next gasoline station is 200 km away, as an example, and that station does not include CNG as a refueling option, it may be desirable to operate in gasoline mode to avoid running low on CNG before getting the option to refuel CNG. Thus, any number of combined examples is contemplated in which it may make better cost or refueling sense to run in one mode versus the other, which is enabled through the use of DTE for each fuel type and as disclosed herein.

In addition, optional displays may be shown as well as described. During driving 420 the driver may reduce the speed of the vehicle 426, but it may be for only a short duration (i.e., a red light) in which case the vehicle is not stopped 428, and the driver continues driving. However, upon stopping 430, such may be for refueling the vehicle 432. If so 434, then the vehicle is parked 404 and refueled 436. After refueling 436, the vehicle is started in the first fuel 410 and the process continues. However, if the vehicle is not stopped for refueling 438, the vehicle is parked 440 and the process ends 442.

As such, a vehicle includes a powertrain that includes an engine that is configured to separately burn first and second types of fuels and propel the vehicle therefrom. A computer of the vehicle is programmed to compute a distance traveled per unit fuel burned for each fuel type, compute distance-to-empty (DTE) for each fuel type, and display DTE for each fuel type. The bi-fuel vehicle may be manufactured by fabricating a vehicle having an ability to power the vehicle from a first fuel and from a second fuel, and providing a computer that is programmed to compute a distance traveled per unit fuel burned for the first fuel type and for the second fuel type, compute distance-to-empty (DTE) for each fuel type, and display DTE for each fuel type.

In addition, the disclosed steps of operation may be executable on a non-transitory computer-readable medium tangibly embodying computer-executable instructions, such as on computer 24. The computer computes a distance traveled per unit fuel burned for each fuel type within a bi-fuel vehicle, computes distance-to-empty (DTE) for each fuel type, and displays DTE for each fuel type. Consistent with the above description, the computer may further include steps to control operation of display 300 and aspects of operation described with respect to FIG. 2 above.

Further, many vehicles get a CNG system added as an aftermarket conversion after having left the plant having only one fuel type. Thus, in one embodiment, a method includes retrofitting a single fuel vehicle to a dual or bi-fuel operation, and correspondingly retrofitting the vehicle for DTE display of each fuel, as disclosed herein. Also, in some vehicles, an individual indicator outside the cluster is added in order for the driver to know the amount of the second fuel. This reduces costs derived from creating a new cluster with two fuel gauge indications and using the same (one-fuel gauge) cluster. In such case, the DTE feature (used for the gasoline fuel) is disabled. This was because the algorithm to compute DTE was created for working with only one fuel (gasoline) and, as part of the DTE algorithm, the miles traveled are accounted to update the miles to empty. As such, when the vehicle runs with the second fuel, the miles traveled are not part of the gasoline DTE. However, offering the gasoline DTE parameter is very useful information for the driver because this allows better management of the vehicle's driving range. To offer at least the gasoline DTE in a bi-fuel vehicle, a new design is used in which the gasoline DTE is updated properly when the vehicle is not operated in gasoline mode. Also, the fuel economy provided by a fuel such as gasoline differs from CNG or LPG. As such, providing the information about the entire vehicle's driving range includes an algorithm that captures and processes the DTE independently.

The disclosed dual DTE algorithm allows the driver to know the fuel level information of both fuels all the time with a cluster that has only one fuel gauge with all the information contained in an originally designed Instrument cluster. This is because the DTE is a direct quantity of the fuel amount. Also, this dual DTE provides the driver information about the entire vehicle driving range by computing individual DTEs for each fuel type. Each DTE is computed based on fuel amount available for each fuel type, as well as the particular fuel economy of the vehicle (based on historic performance, the fuel economy is updated to its most representative value and this varies from vehicle to vehicle).

Information about fuel available in both fuel tanks is, therefore, available and up-to-date in a cluster that has only one fuel gauge indicator. The information provided to the driver consists of DTE, distance traveled and fuel level indication and usage for each fuel, in a dual format which means that, no matter the fuel under which the vehicle is operating, the information of all parameters is always available. In addition, the sum of both DTEs is also displayed in order to give the information of the total driving range. The disclosed design/algorithm allows that the DTE be available in both versions of the car line (mono and bi-fuel) without any difference in any controlling software of the cluster. As such, the vehicle is designed accordingly in order to get one or dual DTE. Further, if a re-fill event of the non-active fuel occurs, the update of the non-active fuel DTE is updated immediately, so there is no need to switch the vehicle to the second fuel.

In addition, it is contemplated that more than a two-fuel vehicle may be included within disclosed embodiments. Thus, in another example, three or more fuel types may be included as options for burning to propel the vehicle, in which case the disclosed display may include toggle options for switching between the three or more fuels, as well as corresponding DTE calculations and displays for each.

Computing devices or processors, such as the controller, generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL), in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer-readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

It will be appreciated that the aforementioned method and devices may be modified to have some components and steps removed, or may have additional components and steps added, all of which are deemed to be within the spirit of the present disclosure. Even though the present disclosure has been described in detail with reference to specific embodiments, it will be appreciated that the various modification and changes can be made to these embodiments without departing from the scope of the present disclosure as set forth in the claims. The specification and the drawings are to be regarded as an illustrative thought instead of merely restrictive thought.

What is claimed is:

1. A vehicle comprising:
an engine; and
a controller to, in response to the engine switching from a first to a second fuel, compute a distance traveled per unit fuel burned for each of the fuels, display a single total distance-to-empty from a distances traveled sum for each of the fuels, and transmit the single total distance-to-empty to a phone within and a device external to the vehicle.

2. The vehicle of claim 1, wherein the controller is further configured to use independent fuel burn parameters of the vehicle for the first and second fuels to compute a distance-to-empty for each of the first and second fuels based on the fuel burn parameters for the first and second fuels and alter the interface to display both distance-to-empty computations for each fuel type on the interface.

3. The vehicle of claim 1, wherein the first fuel is gasoline and the second fuel is one of liquefied petroleum gas (LPG) and compressed natural gas (CNG).

4. The vehicle of claim 1, further comprising a toggle switch to alter the interface to display a distance-to-empty for each of the first fuel and the second fuel.

5. The vehicle of claim 1, wherein the controller is further configured to display an amount of fuel for the first and second fuel.

6. The vehicle of claim 1, wherein the controller is further configured to alter the interface to:
display distances traveled per fuel type; and
display fuel amount for both fuel types on a single gauge.

7. An information display system for a dual-fuel vehicle, comprising:
an interface configured to display a summed distance-to-empty calculated from a distance traveled per unit fuel for each fuel, and having a user-interface button; and
a controller configured to, in response to activation of the button, alter a cellphone paired with the controller to display the summed distance-to-empty and stop displaying the summed distance-to-empty on the interface.

8. The information display system of claim 7, wherein the controller is further configured to access fuel burn parameters of the vehicle for a first fuel and for a second fuel, and compute the distance-to-empty for the first fuel and for the second fuel based on the fuel burn parameters for each fuel type and alter the interface to display the distance-to-empty for the first and second fuels.

9. The information display system of claim 7, wherein a first fuel is gasoline and a second fuel is one of liquefied petroleum gas (LPG) and compressed natural gas (CNG).

10. The information display system of claim 8, wherein the controller is further configured to alter the interface to display the summed distance-to-empty and the distance-to-empty for the first and second fuels.

11. The information display system of claim 7 further comprising a toggle switch to selectively alter the interface to display a distance-to-empty of the first fuel or the second fuel.

12. The information display system of claim 7, wherein the controller is further configured to alter the interface to:
display fuel level for each fuel type with only one gauge.

13. A vehicle information system control method comprising:
in response to receiving a request for a summed total distance-to-empty based on a first and a second fuel from a cellular telephone, send, via a controller, data of the summed total distance-to-empty from a sum of a distance traveled per unit fuel for each fuel such that the cellular telephone is configured to display the data on an interface.

* * * * *